Oct. 20, 1953      H. T. SEALE      2,656,016

AUXILIARY CONTROL VALVE FOR BUSSES

Filed Aug. 9, 1952      2 Sheets-Sheet 1

INVENTOR.

HOMER T. SEALE

BY Lyon Lyon

ATTORNEYS

INVENTOR.
HOMER T. SEALE
BY Lyon & Lyon
ATTORNEYS

Patented Oct. 20, 1953

2,656,016

UNITED STATES PATENT OFFICE 2,656,016

AUXILIARY CONTROL VALVE FOR BUSSES

Homer T. Seale, Los Angeles, Calif.

Application August 9, 1952, Serial No. 303,486

8 Claims. (Cl. 188—152)

My invention relates to auxiliary control valves for busses, more particularly to valves especially designed for busses for use to avoid secondary accidents which sometimes occur when, due to an initial accident, the air supply to the front brakes is lost or if, for some other reason, the brake control or pedal cannot be operated.

Included in the objects of my invention are:

First, to provide an auxiliary valve which may be mounted adjacent the driver's seat in a relatively protected location yet readily available in the event of an accident to seal off all lines forward of the driver's seat, and then serve as a hand brake control for the rear brakes of the vehicle.

Second, to provide a shutoff and a rear brake application valve of this class which, during the expected long periods of non-usage, does not in any manner interfere with the conventional operation of the brakes.

Third, to provide an auxiliary valve of this class which may be readily and quickly tested or test-operated from time to time to insure its dependability in an emergency.

Fourth, to provide an auxiliary valve of this class which is inherently simple of construction and is adaptable to a variety of installations to conform with safety regulations and permit incorporation in existing brake systems.

With the above and other objects in view as may appear hereinafter, reference is directed to the accompanying drawings in which:

Figure 3 shows the valve in its normal position.

Figure 4 shows the valve in an intermediate or auxiliary position, wherein the supply to the front wheels of the vehicle is closed off.

Figure 5 shows the valve employed as a hand valve to brake the rear wheels of the vehicle.

Figure 1:
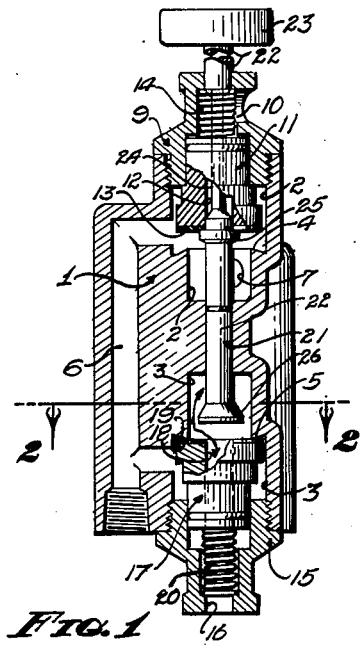
Figure 1 is a longitudinal sectional view of my bus auxiliary valve.
Figure 2:
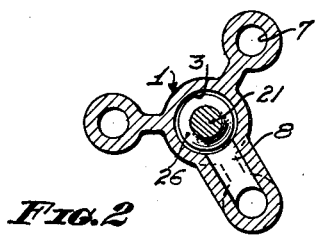
Figure 2 is a transverse sectional view of my bus auxiliary valve through 2—2 of Figure 1.

My bus auxiliary valve is intended for a manual operation and for installation to one side, and possibly, to the rear of the driver's seat in a relatively protected position so that it will not be damaged even in the event of a severe collision, resulting in damage to the front wheel brake system or the rupture of the air lines to the front wheel brakes.

The valve includes a body structure 1 having a vertical bore therethrough terminating in an upper valve cavity 2 and in a lower valve cavity 3. These cavities are counterbored to form therein an upper valve seat shoulder 4 and a lower valve seat shoulder 5. The valve seat cavities are connected to a supply passage 6 which intersects the cavities above and below the shoulders 4 and 5, respectively.

The reduced portion of the upper valve cavity, below the shoulder 4, is connected with an outlet passage 7 whereas the reduced portion of the lower valve cavity above the shoulder 5 is connected with an outlet passage 8. In order to facilitate installation of the auxiliary valve, the supply passage 6 and outlet passages 7 and 8, may extend longitudinally of the body structure and terminate at its lower end for connection to appropriate pipe lines.

The upper valve cavity 2 is closed by an upper cap 9 having a vertical opening therethrough, and a laterally directed relief port 10. The upper cap 9 is counterbored to a diameter equal to the inner or reduced diameter portion of the upper valve cavity 2. Slidably fitting in sealed relation with the counterbore in the upper cap, is an upper valve 11. The upper valve is in the form of a stepped cylinder having a bore 12; the lower extremity of the valve 11 is enlarged in diameter and provided with a valve seat 13 which engages the shoulder 4. A spring 14 between the upper end of the valve 11 and the cap 9 urges the valve toward the shoulder 4.

Similarly, the lower valve cavity 3 is provided with a lower cap 15, in this case, having an axially directed relief port 16. The lower cap is counterbored to a diameter equal to the reduced upper portion of the lower cavity 3 and slidably and sealingly receives a lower valve 17, similar to the upper valve 11. The lower valve is provided with a central bore 18 and its upper or larger end is provided with a valve seat which engages the lower shoulder 5. A spring 20, between the valve 17 and lower end of the lower cap, urges the valve 17 against its shoulder 5.

The upper and lower valve cavities are joined by a bore 21. A manually operable control stem 22 extends downwardly through the upper cap 9, upper valve 11 and bore 21 and terminates adjacent the lower valve 17. The upper or exposed end of the control stem 22 is provided with a handle 23. The section of the control stem which passes through the bore of the upper valve 11 is reduced in diameter as indicated by 24. Immediately below the reduced section 24 the control stem is provided with a valve shoulder or seat 25 which is capable of cooperating with that portion of the valve seat 13 surrounding the lower end of the bore 12 to seal this bore. The lower extremity of the stem 22 is provided with a head 26 of larger diameter than the bore 18 so as to engage the inner portion of the valve seat 19 surrounding this bore.

Figure 3:
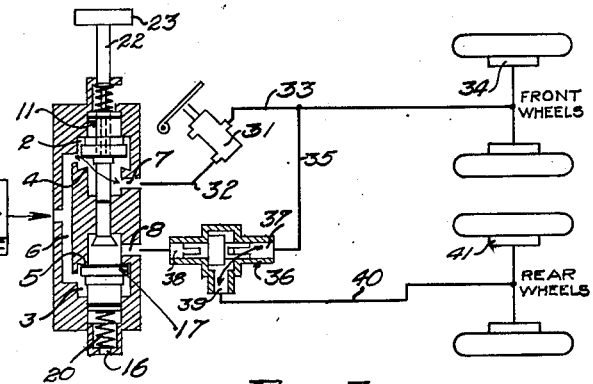

Operation of my bus auxiliary valve is as follows:

My bus auxiliary valve is installed in the air brake system of a bus with its supply passage 6 connected with a source of air pressure indicated diagrammatically in Figure 3. The upper outlet port is connected to a 3-way valve or main control valve 31 through a line 32. This valve may be foot or hand operated. The brake application outlet of the main control valve 31 is connected through a line 33 to the front wheel brakes 34. In the simplified diagrammatical view, the line 33 is shown as connected directly to the front wheels. In actual practice, intermediate mechanisms, such as booster valves, may be employed. A branch line 35 communicates with a selector valve 36. The selector valve which, for the purpose of my present invention, is conventional, comprises essentially a double acting check valve having two inlets 37 and 38 and an outlet 39. The outlet 39 is connected by a line 40 to the rear wheel brakes 41. The other outlet port 8 of my valve is connected to the second inlet port 38 of the selector valve 36.

With reference to Figure 3, under normal operation of the bus brake system, it is desired that the main control valve 31 operate both the front and rear wheels. Thus, the control stem 22 of the auxiliary valve is in its upper position. Under these conditions, the upper valve 11 is open for flow from the supply passage 6 to the port 7. The valve shoulder 25 seals the bore 12 of the upper valve to prevent loss of air through the relief port 10.

The lower valve 17 is seated against the shoulder 5. Inasmuch as the lower end or head 26 of the control stem clears the lower valve, the lower outlet port 8 is vented to atmosphere through the bore 18 of the lower valve and corresponding relief port 16. The lack of pressure at the port 38 of the selector valve causes this valve to assume a position in which flow in either direction may occur between ports 37 and 39 so that both the front and the rear brakes may be applied and released at will by operation of the main control valve 31.

Figure 4:
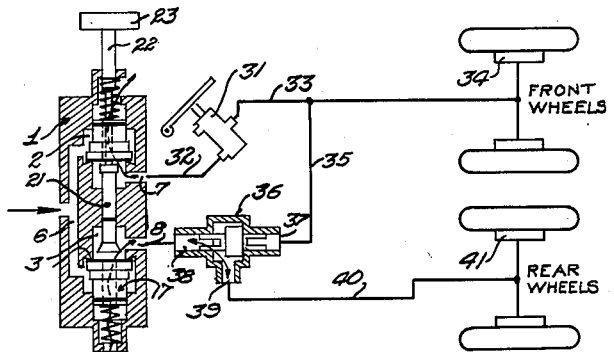

In the event of a collision or damage of any kind to the front wheel brake system which results in rupture of the line 32 or line 33 or prevents operation of the main control valve, the control stem 22 may be pushed downwardly to the intermediate or emergency position shown in Figure 4. Under these conditions, the upper valve 11 seats against the upper shoulder 4, sealing the supply passage 6 from the line 32, leading to the main control valve 31. Simultaneously, the valve shoulder 25 clears the upper valve 11 to open the line 32 to atmosphere through the bore 12 of the upper valve and the relief port 10. The line between the lower valve outlet port 8 and port 38 of the selector valve remains open to atmosphere.

Further depression of the control stem 22 brings the head 26 into engagement with the valve seat 19 to seal the bore 18 of the lower valve so that depression on the lower valve to disengage it from the shoulder 5 permits supply of air through ports 38 and 39 of the selector to the rear wheels. Thus, by manually operating the control stem between the intermediate position, shown in Figure 4, and the depressed position, shown in Figure 5, the rear brakes of the vehicle may be controlled.

Figure 5:
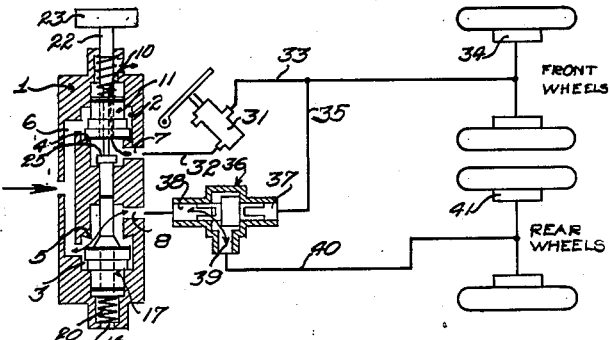
Figures 3, 4 and 5 are diagrammatical views, illustrating the operation of the auxiliary valve.

It should be observed that the connections between the bus auxiliary valve selector valve and main control valve may be reversed. That is, the lower outlet port may be connected to the foot valve, and the upper outlet port may be connected to the selector valve. In this case, the normal condition of the auxiliary valve would be as shown in Figure 5, and the auxiliary braking condition would be as shown in Figure 3, and the control stem would be pulled inwardly rather than forced downwardly to effect auxiliary operation.

Figure 6:
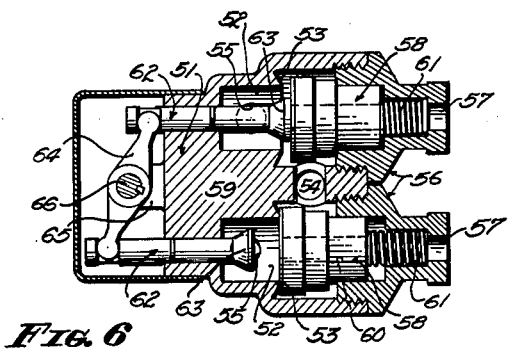
Figure 6 is a sectional view through 6—6 of Figure 7 showing a modified form of my auxiliary control valve.
Figure 7:
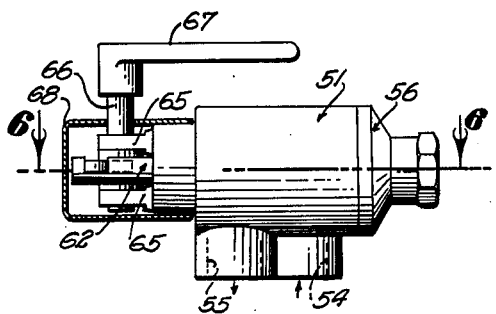
Figure 7 is a side view thereof with a cover member in section.
Figure 8:
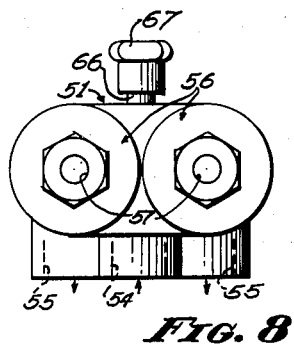
Figure 8 is a front view thereof.

Reference is now directed to Figures 6, 7 and 8. Operation of the structure here shown is substantially identical to the first described valve structure, the difference being confined principally to a rearrangement of the valve units into parallel rather than coaxial relation.

A valve body 51 is provided having parallel cavities 52. These cavities are counterbored to form valve seat shoulders 53. The counterbored portions of the cavities are connected to a common supply passage 54 corresponding to passage 6 of the first described structure. The reduced portions of the valve cavities are connected to outlet passages 55.

The valve cavities are closed by caps 56, each having an axially directed relief port 57. Each cap 56 is counterbored to a relative diameter of the inner portion of the corresponding valve cavity, and slidably and sealingly receives a valve member 58, corresponding to the valve member 11 or 17.

Each valve member 58 is provided with a seat 59 at its inner end and a bore 60. A spring 61 urges the inner end of each valve member 58 toward the corresponding shoulder 53.

A valve stem passage is disposed in alignment with each valve cavity 52 and sealingly and slidably receives a valve stem 62 having a head 63 adapted to cover the bore 60 of its corresponding valve member 58.

The valve stems 62 are intended to be operated simultaneously by any suitable means to accomplish the results of the first valve structure. One such means comprises a rocker arm 64 oscillatably supported by bosses 65 projecting from the valve body 51. The arm is mounted on a shaft 66 which projects to one side of the body 51 and is provided with a handle 67. A cap 68 may cover the rocker arm and adjacent ends of the stems 62.

It will be observed that either valve unit may correspond to the lower valve unit of the first described structure and the other correspond to the upper valve unit. In either case, a first position with passages open or closed, as in Figure 3, may be obtained; an intermediate position corresponding to Figure 4 may be obtained; and an extreme braking position corresponding to Figure 5 may be obtained.

While particular pressure areas have been indicated for various pressure responsive parts of the valve constructions, such as the valve stems, valve members, and bores of the valve members, it should be understood that their relative effective areas may be varied; furthermore, while the two valve units of the different structures shown are indicated as identical in size, they may be made different in size. By such changes the valve structures may be "biased" or tend to move toward one position or the other, or require a greater or lesser amount of manual effort to operate the valve structures.

Having fully described my invention, it is to be understood that I do not wish to be limited to the details herein set forth, but my invention is of the full scope of the appended claims.

I claim:

1. In a vehicle air brake system having an air supply, front and rear brakes, a manually operated brake control valve for both said front and rear brakes, and an automatic selector valve between said brake control valve and rear wheels, the combination of an auxiliary brake valve, comprising: a valve body having a pair of valve cavities, inlets to said valve cavities adapted for connection to said air supply, an outlet from one of said valve cavities to said control valve and an outlet from the other of said valve cavities to said selector valve; valve members for said valve cavities, said valve members having bleed ports; a manually operable control means extending into said body member and engageable with said valve members, said control means including valve elements engageable with said bleed ports to close said bleed ports when said valve members are moved to open communication between said inlets and outlets and to open said bleed ports when said valve members close communication between said inlets and outlets, said control member being manually operated to close supply to and bleed air from said brake control valve and thereupon control flow to said selector valve and the rear wheel brakes of said vehicle.

2. A valve structure, comprising: a valve body having a pair of valve cavities, inlets to said valve cavities adapted for connection to an air supply, an outlet from each of said valve cavities, valve members in said valve cavities for controlling communication between said inlets and said outlets, said valve members having bleed ports, a manually operable control means extending into said body member and engageable with said valve members, said control means including valve elements engageable with said bleed ports to close said bleed ports when said valve members are moved to open communication between said inlets and outlets and to open said bleed ports when said valve members close communication between said inlets and outlets.

3. A valve structure, comprising: a valve body having a bore therethrough and valve cavities at each end stepped to form valve seat shoulders, an inlet and an outlet for each valve cavity; a valve member in each valve cavity engageable with its corresponding valve seat shoulder to isolate the corresponding inlet and outlet, each valve member having a bleed port therein; and a manual control member extending through one of said valve members and confronting the other, said control member having valve seats engageable with said valve members to seal said bleed ports and to move said valve members to their open positions.

4. A valve structure, comprising: a valve body having a pair of valve cavities stepped to form valve seat shoulders, an inlet and an outlet for each valve cavity; caps for said valve cavities having bleed outlets, valve members slidable in said caps and engageable with said valve seat shoulders, said valve members having bleed bores; and a manual control means having valve seats engageable with said valve members to close their bleed bores, said control means engageable with said valve members to effect control of flow between said inlets and outlets.

5. An air brake control for vehicles having front and rear air brakes, and a source of air pressure, comprising: a manually operated main brake control connected to both the front and rear air brakes of a vehicle; an automatic selector valve interposed between said main brake control and said rear brakes, said selector valve having a first position permitting flow between said main brake control and rear brakes, and a second position isolating said main brake control and permitting flow between said source and said rear air brakes only; and a manually operable auxiliary valve having a first flow passage interposed between said source of air pressure and said main brake control, and a second flow passage between said source of air pressure and said selector valve, valve elements interposed in said flow passages; a manual control member engageable with said valve elements and having a normal position closing flow to said selector valve and maintaining flow to said main brake control, and an emergency position closing flow to both said main brake control and selector valve, said manual control member being manually movable from its emergency position to permit flow of air through said selector valve thereby to operate said rear brakes independently of said main brake control.

6. An air brake control for vehicles having front and rear air brakes, and a source of air pressure, comprising: a manually operated main brake control connected to both the front and rear air brakes of a vehicle; an automatic selector valve interposed between said main brake control and said rear brakes, said selector valve having a first position permitting flow between said main brake control and rear brakes, and a second control isolating said main brake control and permitting flow between said source and said rear air brakes; and a manually operable auxiliary valve including a valve body having a pair of valve cavities stepped to form valve seat shoulders, an inlet from said air pressure source to each valve cavity, an outlet from one valve cavity connected with said main brake control and an outlet from the other valve cavity connected with said selector valve; a valve member in each valve cavity engageable with its corresponding valve seat shoulder to isolate the corresponding inlet and outlet, each valve member having a bleed port therein; and a manual control means having valve seats engageable to control said bleed ports and to move said valve members, said manual control means and valve members having a normal position wherein said main brake control is connected with said air pressure source and said selector valve is connected with a bleed port, and an emergency position wherein communication between said air pressure source and both said main brake control and selector valve is closed and both communicate with the bleed ports of said valve members, said control means being manually movable from its emergency position to supply air to said selector valve thereby to operate said rear brakes.

7. A valve structure as set forth in claim 4, wherein: said valve body has a bore extending from end to end and said valve cavities are disposed at opposite ends of said bore; said control means includes a stem extending through one of said caps and its valve member and terminating in confronting relation with the other valve member, and the valve seats of said control means are carried by said stem.

8. A valve structure as set forth in claim 4, wherein: said valve cavities are arranged side by side in said valve body; and said control means includes a pair of stems having said valve seats disposed in confronting relation to the inner ends of said valve members; and means is provided to operate said stems in concert.

HOMER T. SEALE.

References Cited in the file of this patent

UNITED STATES PATENTS

| Number | Name | Date |
|---|---|---|
| 2,323,927 | Mercier | July 13, 1943 |
| 2,336,887 | Piron | Dec. 14, 1943 |
| 2,585,045 | Schmidlin | Feb. 12, 1952 |